US012322223B2

(12) United States Patent
Curtis

(10) Patent No.: US 12,322,223 B2
(45) Date of Patent: Jun. 3, 2025

(54) COMPUTE SYSTEM WITH CONTROLLER AREA NETWORK VEHICLE IDENTIFICATION MECHANISM AND METHOD OF OPERATION THEREOF

(71) Applicant: MOJ.IO, Inc., Vancouver (CA)

(72) Inventor: James Anthony Curtis, Temecula, CA (US)

(73) Assignee: MOJ.IO, Inc., Vancouver (CA)

( * ) Notice: Subject to any disclaimer, the term of this patent is extended or adjusted under 35 U.S.C. 154(b) by 539 days.

(21) Appl. No.: 17/483,454

(22) Filed: Sep. 23, 2021

(65) Prior Publication Data

US 2023/0093840 A1 Mar. 30, 2023

(51) Int. Cl.

*G07C 5/02* (2006.01)
*G07C 5/00* (2006.01)
*G07C 5/08* (2006.01)

(52) U.S. Cl.

CPC ........... *G07C 5/0808* (2013.01); *G07C 5/008* (2013.01); *G07C 5/02* (2013.01)

(58) Field of Classification Search

CPC ......... G07C 5/0808; G07C 5/008; G07C 5/02
See application file for complete search history.

(56) References Cited

U.S. PATENT DOCUMENTS

| | | | | |
|---|---|---|---|---|
| 9,117,319 | B2 | 8/2015 | Chen et al. | |
| 2009/0276115 | A1* | 11/2009 | Chen | G07C 5/0808 701/29.6 |
| 2009/0287499 | A1* | 11/2009 | Link, II | G08G 1/20 705/317 |
| 2014/0277909 | A1 | 9/2014 | Bertosa et al. | |
| 2020/0351629 | A1 | 11/2020 | Mendes et al. | |
| 2021/0271962 | A1* | 9/2021 | Abhishek | G07C 5/0808 |

* cited by examiner

*Primary Examiner* — Vivek D Koppikar
*Assistant Examiner* — Jeffrey R Chalhoub
(74) *Attorney, Agent, or Firm* — Perspectives Law Group, Corp.

(57) ABSTRACT

A method of operation of a compute system comprising: determining a potential ignition-on event from an on-board diagnostics; receiving a message group from the on-board diagnostic based on the potential ignition-on event; determining a match between a footprint and the message group; identifying a vehicle make-model-year based on the match and the footprint; decoding a vehicle identification based on the vehicle make-model-year and the footprint; and communicating the vehicle make-model-year, the vehicle identification, or a combination thereof for displaying on a device.

20 Claims, 7 Drawing Sheets

COMPUTE SYSTEM WITH CONTROLLER AREA NETWORK VEHICLE IDENTIFICATION MECHANISM AND METHOD OF OPERATION THEREOF

TECHNICAL FIELD

An embodiment of the present invention relates generally to a compute system, and more particularly to a system with a controller area network vehicle identification mechanism.

BACKGROUND ART

Modern compute systems, especially transportation systems, are providing increasing levels of functionality to support modern life including additional status monitoring, connectivity services, and diagnostic services. Technology has enabled increased diagnostic information and usage of the diagnostic information for a vehicle. Research and development in the existing technologies can take a myriad of different directions.

As users become more empowered with the growth of obtaining more intelligence in vehicles, the need for an accurate diagnostic information of the vehicle has increased. However, in the midst of increased diagnostic and usage information, other challenges arise with vehicles.

Thus, a need still remains for a compute system with a controller area network vehicle identification mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a compute system including: determining a potential ignition-on event from an on-board diagnostic; receiving a message group from the on-board diagnostics based on the potential ignition-on event; determining a match between a footprint and the message group; identifying a vehicle make-model-year based on the match and the footprint; decoding a vehicle identification based on the vehicle make-model-year and the footprint; and communicating the vehicle make-model-year, the vehicle identification, or a combination thereof for displaying on a device.

An embodiment of the present invention provides a compute system, including: a communication unit configured to: determine a potential ignition-on event from an on-board diagnostic; receive a message group from the on-board diagnostic based on the potential ignition-on event; a control circuit, coupled to the communication unit, to: determine a match between a footprint and the message group; identify a vehicle make-model-year based on the match and the footprint; decode a vehicle identification based on the vehicle make-model-year and the footprint; and communicating the vehicle make-model-year, the vehicle identification, or a combination thereof for displaying on a device.

An embodiment of the present invention provides a non-transitory computer readable medium including instructions executable by a control circuit for a compute system, including: determining a potential ignition-on event from an on-board diagnostic; receiving a message group from the on-board diagnostics based on the potential ignition-on event; determining a match between a footprint and the message group; identifying a vehicle make-model-year based on the match and the footprint; decoding a vehicle identification based on the vehicle make-model-year and the footprint; and communicating the vehicle make-model-year, the vehicle identification, or a combination thereof for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
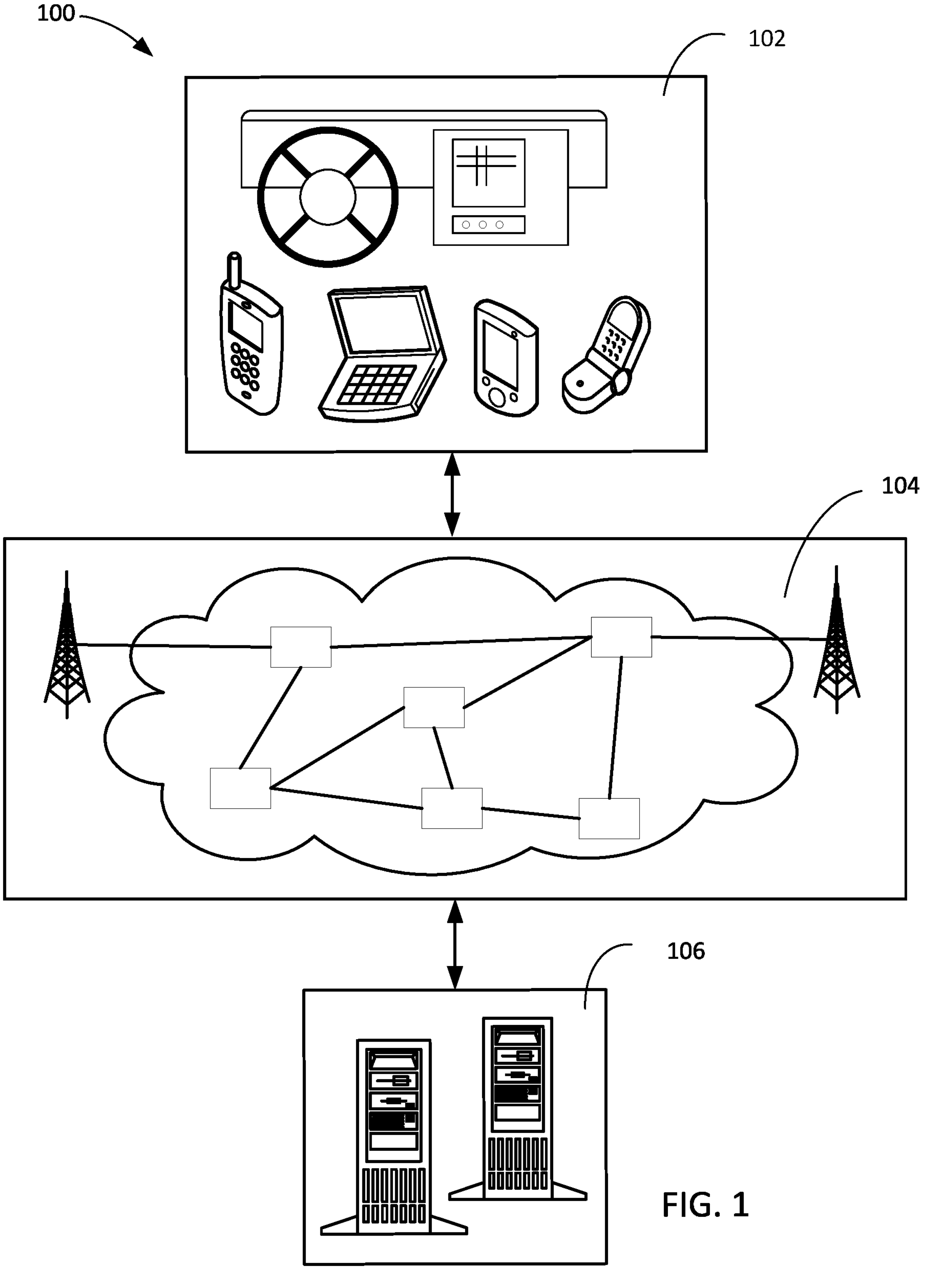
FIG. 1 is a compute system with a controller area network vehicle identification mechanism in an embodiment of the present invention.

Embodiments provide the compute system can minimize the complexity to determine the year, make, and model of a vehicle by detecting the message group of the controller area network. The identification of the messages of the controller area network allows the compute system to match the message group with a footprint to determine the year, make, and model of the vehicle of the compute system.

Embodiments provide the compute system can identify the year, make, and model of the vehicle of the compute system by processing the messages of the controller area network. The correct identification of the message group from the controller area network can allow the compute system to identify the year, make, and model of the vehicle. As an example, the compute system can determine the year, make, and model of the vehicle by comparing the message group to a database of identified vehicles.

Embodiments provide the simplified and robust determination of the vehicle make-model-year based on the message group obtained by the on-board diagnostics from the controller area network without decoding the vehicle identification from the controller area network. For example, the compute system can determine the vehicle make-model-year of the vehicle when the vehicle identification cannot be decoded by the on-board diagnostics from the controller area network. As a further example, the compute system can determine the vehicle make-model-year of the vehicle before the on-board diagnostics decodes the vehicle identification from the controller area network.

Embodiments provide improvements to the reliability of the compute system by processing the message group in the controller area network to verify the vehicle make-model-year utilizing the vehicle identification. The controller area network vehicle identification mechanism can verify that the proper diagnostic information is being provided from the vehicle based on the vehicle make, the vehicle model and the model year. As an example, the compute systems can correctly gather accurate records for the vehicle by accessing specific original equipment manufacturer (OEM) parameters for the vehicle.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention. The terms first, second, etc. can be used throughout as part of element names and are used as a matter of descriptive convenience and are not intended to have any other significance or provide limitations for an embodiment.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a compute system 100 with a controller area network vehicle identification mechanism in an embodiment of the present invention. The compute system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a vehicle, a telematics system in a vehicle, a computing device, a cellular phone, a tablet computer, a smart phone, a notebook computer, vehicle embedded navigation system, or computing device. The first device 102 can couple, either directly or indirectly, to the communication path 104 to communicate with the second device 106 or can be a stand-alone device.

The second device 106 can be any of a variety of centralized or decentralized computing devices, sensor devices to take measurements or record environmental information, such as sensor instruments, sensor equipment, or a sensor array. For example, the second device 106 can be a multimedia computer, a laptop computer, a desktop computer, grid-computing resources, a virtualized computer resource, cloud computing resource, routers, switches, peer-to-peer distributed computing devices, an on-board diagnostics dongle, or a combination thereof.

The second device 106 can be mounted externally or internally to a vehicle, centralized in a single room or within a vehicle, distributed across different rooms, distributed across different geographical locations, embedded within a telecommunications network. The second device 106 can couple with the communication path 104 to communicate with the first device 102.

For illustrative purposes, the compute system 100 is described with the second device 106 as a computing device, although it is understood that the second device 106 can be different types of devices, such as a standalone sensor or measurement device. Also for illustrative purposes, the compute system 100 is shown with the second device 106 and the first device 102 as end points of the communication path 104, although it is understood that the compute system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (lrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
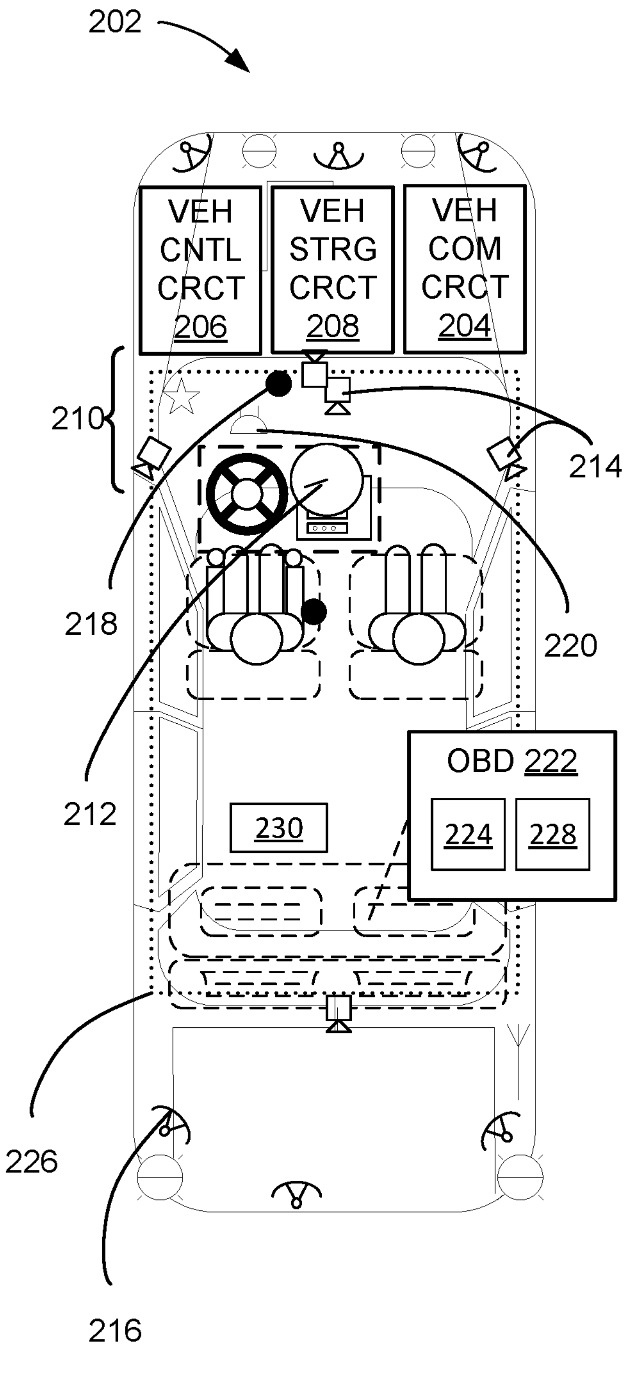
FIG. 2 is an example of a top plan view illustration of a vehicle for the compute system.

Referring now to FIG. 2, therein is shown an example a top plan view of a vehicle 202 for the compute system 100 of FIG. 1. As an example, the compute system 100 can include or interact with the first device 102 of FIG. 1 as the vehicle 202. The vehicle 202 can also include one or more of environmental sensors 210. The vehicle 202 is an object or a machine used for transporting people or goods. The vehicle 202 can also be capable of providing assistance in maneuvering or operating the object or the machine.

The vehicle 202 can include or represent different types of vehicles. For example, the vehicle 202 can be an electric vehicle, a combustion vehicle, or a hybrid vehicle. Also for example, the vehicle 202 can be an autonomous vehicle or non-autonomous vehicle. As a specific example, the vehicle 202 can include a car, a truck, a cart, or a combination thereof.

The vehicle 202 can include a device, a circuit, one or more specific sensors, or a combination thereof for providing assistance or additional information to control, maneuver, or operate the vehicle 202. The vehicle 202 can include a vehicle communication circuit 204, a vehicle control circuit 206, a vehicle storage circuit 208, other interfaces, or a combination thereof.

The vehicle 202 can also include on-board diagnostics 222 (OBD) that can be accessed by the vehicle control circuit 206. As an example, the vehicle control circuit 206 can access the on-board diagnostics 222 with the vehicle communication circuit 204. The vehicle 202 can store and retrieve the on-board diagnostics 222 to and from the vehicle storage circuit 208.

The on-board diagnostics 222 represent information about the vehicle 202. For example, the on-board diagnostics 222 can provide status or the state of the vehicle 202 or a portion thereof. The on-board diagnostics 222 can also represent an ignition status 224. The ignition status 224 represents the current state of ignition. The ignition status 224 can represent whether the engine is on or off. The term "on" refers to the engine that is running. The term "off" refers to the engine that is not running.

The on-board diagnostics 222 can provide information about a battery 230. Although the battery 230 can differ in size, capacity, and type depending on the vehicle 202, the battery 230 provides voltage values that can be read as part of the on-board diagnostics 222.

The on-board diagnostics 222 can be transmitted by a controller area network 226 in the vehicle 202. The controller area network 226 allows communication between the vehicle communication circuit 204, the vehicle control circuit 206, the vehicle storage circuit 208, the on-board diagnostics 222, other interfaces, or a combination thereof. The controller area network 226 can also allow for communication with the environmental sensors 210 with the rest of the vehicle 202.

The on-board diagnostics 222 can be obtained by an external device utilizing the on-board diagnostics port 228. The on-board diagnostics port 228 allows an external device to communicate the vehicle communication circuit 204, the vehicle control circuit 206, the vehicle storage circuit 208, the on-board diagnostics 222, other interfaces, or a combination thereof along the controller area network 226. For example, the on-board diagnostics port 228 can be accessed utilizing an on-board diagnostics dongle.

The vehicle storage circuit 208 can include a functional unit or circuit integral to the vehicle 202 and configured to store and recall information. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the compute system 100 or vehicle manufacturer, or a combination thereof. The vehicle storage circuit 208 can store the information for the on-board diagnostics 222.

The vehicle control circuit 206 can include a function unit or circuit integral to the vehicle 202 and configured to execute or implement instructions. The vehicle control circuit 206 can execute or implement the vehicle software to provide the intelligence of the vehicle 202, the compute system 100, or a combination thereof. The vehicle control circuit 206 can respond to requests for the on-board diagnostics 222. The request can be from other parts of the vehicle 202, the compute system 100, or a combination thereof or external to the compute system 100.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof The vehicle communication circuit 204 can include a function unit or circuit integral to the vehicle 202 and configured to enable external communication to and from the vehicle 202. For example, the vehicle communication circuit 204 can permit the vehicle 202 to communicate with the first device 102, the second device 106 of FIG. 1, the communication path 104 of FIG. 1, or a combination thereof. The vehicle communication circuit 204 can provide the on-board diagnostics 222 to other portions of the vehicle 202, the compute system 100, or a combination thereof or external to the compute system 100.

The vehicle communication circuit 204 can also function as a communication hub allowing the vehicle 202 to function as part of the communication path 104 and not limited to be an end point or terminal circuit to the communication path 104. The vehicle communication circuit 204 can include active and passive components, such as microelectronics or an antenna, for interaction with the communication path 104. For example, the vehicle communication circuit 204 can include a modem, a transmitter, a receiver, a port, a connector, or a combination thereof for wired communication, wireless communication, or a combination thereof.

The vehicle communication circuit 204 can couple with the communication path 104 to send or receive information directly between the vehicle communication circuit 204 and the first device 102, the second device 106, or a combination thereof as endpoints of the communication, such as for direct line-of-sight communication or peer-to-peer communication. The vehicle communication circuit 204 can further couple with the communication path 104 to send or receive information through a server or another intermediate device in between endpoints of the communication.

The vehicle 202 can further include various interfaces. The vehicle 202 can include one or more interfaces for interaction or internal communication between functional units or circuits of the vehicle 202. For example, the vehicle 202 can include one or more interfaces, such as drivers, firmware, wire connections or buses, protocols, or a combination thereof, for the vehicle storage circuit 208, the vehicle control circuit 206, or a combination thereof.

The vehicle 202 can further include one or more interfaces for interaction with an occupant, an operator or a driver, a passenger, or a combination thereof relative to the vehicle 202. For example, the vehicle 202 can include a user interface including input or output devices or circuits, such as a screen or touch screen, a speaker, a microphone, a keyboard or other input devices, an instrument panel, or a combination thereof.

The vehicle 202 can further include one or more interfaces along with switches or actuators for physically controlling movable components of the vehicle 202. For example, the vehicle 202 can include the one or more interfaces along with the controlling mechanisms to physically perform and control the maneuvering of the vehicle 202, such as for automatic driving or maneuvering features.

The functional units or circuits in the vehicle 202 can work individually and independently of the other functional units or circuits. The vehicle 202 can work individually and independently from the first device 102, the communication path 104, the second device 106, other devices or vehicles, or a combination thereof.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device for detecting or identifying environment of the vehicle 202. The environmental sensors 210 can detect, identify, determine, or a combination thereof for the vehicle 202 itself, such as for status or movement thereof. The environmental sensors 210 can detect, identify, determine, or a combination thereof for environment within a cabin of the vehicle 202, an environment external to and surrounding the vehicle 202, or a combination thereof.

For example, the environmental sensors 210 can include a location-movement sensor 212, a visual sensor 214, a radar sensor 216, an accessory sensor 218, a volume sensor 220, or a combination thereof. The location-movement sensor 212 can identify or calculate a geographic location of the vehicle 202, determine a movement of the vehicle 202, or a combination thereof. Examples of the location-movement sensor 212 can include an accelerometer, a speedometer, a GPS receiver or device, a gyroscope or a compass, or a combination thereof. The vehicle 202 can include the environmental sensors 210 other than or in addition to the location-movement sensor 212, such as thermal sensor. The thermal sensor can capture and provide temperature readings for portions of the vehicle 202. The thermal sensor can also capture and provide temperature readings external to the vehicle 202.

The visual sensor 214 can include a sensor for detecting or determining visual information representing the environment external to and surrounding the vehicle 202. The visual sensor 214 can include a camera attached to or integral with the vehicle 202. For example, the visual sensor 214 can include a camera, such as forward facing camera, a rear-view or back-up camera, a side-view or a blind-spot camera, or a combination thereof. Also for example, the visual sensor 214 can include an infrared sensor or a night vision sensor.

The visual sensor 214 can further include a camera on the first device 102 connected to and interacting with the vehicle 202. The visual sensor 214 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the vehicle 202 a relative location or a distance between the object or the target and the vehicle 202, or a combination thereof.

The radar sensor 216 can utilize radio waves to determine or identify an existence of the object or the target, the relative location or a distance from the vehicle 202, or a combination thereof. For example, the radar sensor 216 can include a proximity sensor or warning system, such as for an area in front of, behind, adjacent to or on a side of, or a combination thereof geographically or physically relative to the vehicle 202.

The accessory sensor 218 can include a sensor for determining or detecting a status of a subsystem or a feature of the vehicle 202. The accessory sensor 218 can determine or detect the status or a setting for windshield wipers, turn signals, gear setting, headlights, or a combination thereof.

The volume sensor 220 can include a sensor for detecting or determining sounds for the vehicle 202. The volume sensor 220 can include a microphone for detecting or determining sounds within a cabin of the vehicle 202. The volume sensor 220 can further include a circuit for detecting or determining a volume level or an output level of speakers within the vehicle 202.

The vehicle 202 can use one or more of the environmental sensors 210 to generate the on-board diagnostics 222 describing or representing information regarding the environment within or surrounding the vehicle 202. The on-board diagnostics 222 can be further processed with the vehicle control circuit 206, stored in the vehicle storage circuit 208, communicated to another device through the vehicle control circuit 206, or a combination thereof.

The vehicle 202 can further include a user device or a mobile device illustrated in FIG. 1. For example, the vehicle 202 can include the first device 102. As a further example, the vehicle 202 can include an on-board diagnostics dongle.

As a more specific example, the vehicle communication circuit 204, the vehicle control circuit 206, the vehicle storage circuit 208, the environmental sensors 210, one or more interfaces, or a combination thereof can be included in or make up the first device 102 included in or integral with the vehicle 202. Also as a more specific example, the vehicle 202 can include or be integral with the first device 102 including an embedded computer system, an infotainment system, a smart driving or a driver assistance system, a self-driving or a maneuvering system for the vehicle, or a combination thereof.

Figure 3:
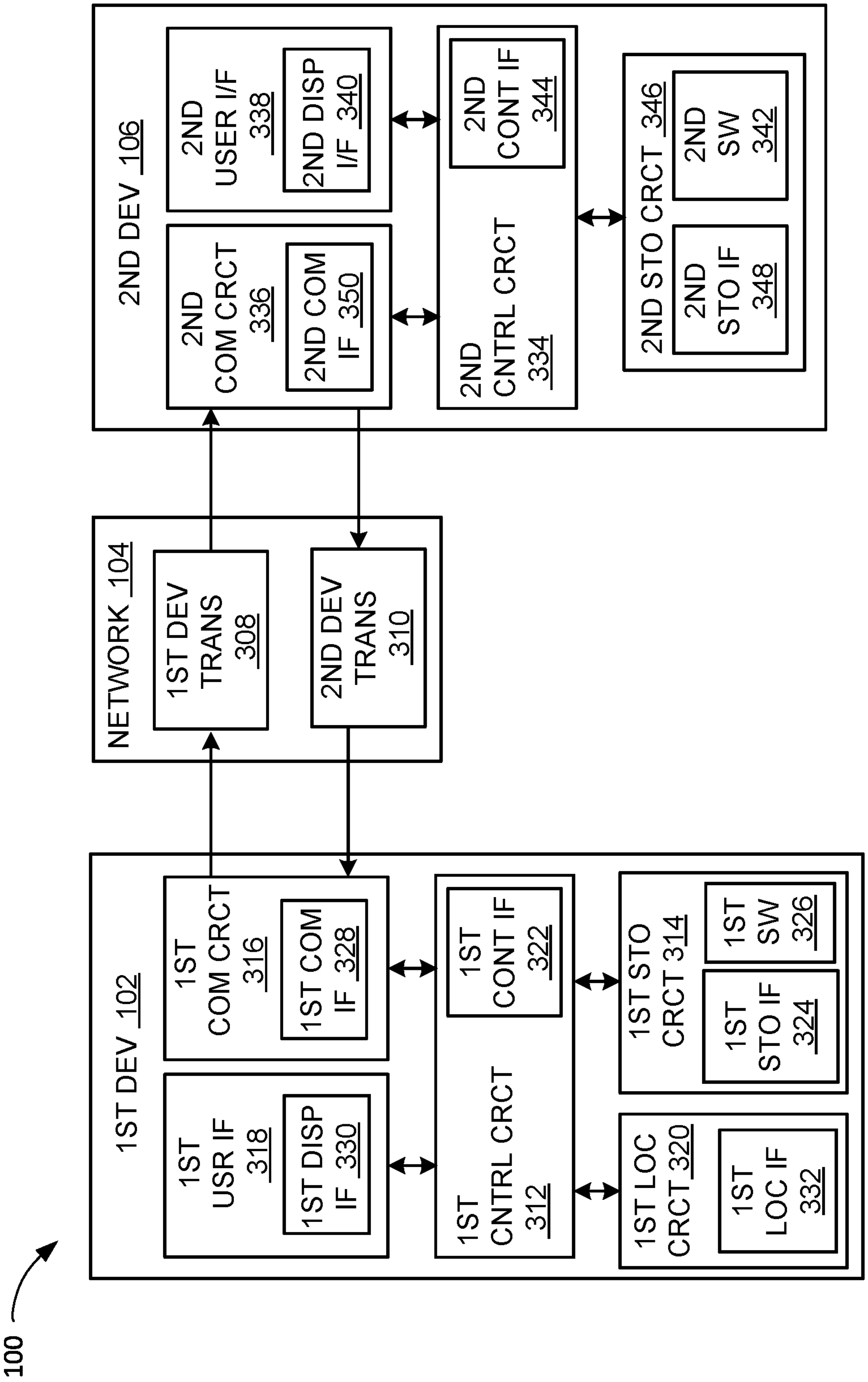
FIG. 3 is an exemplary block diagram of the compute system.

Referring now to FIG. 3, therein is shown an exemplary block diagram of the compute system 100. The compute system 100 can include the first device 102, the communication path 104, and the second device 106. The first device 102 can send information in a first device transmission 308 over the communication path 104 to the second device 106.

The second device 106 can send information in a second device transmission 310 over the communication path 104 to the first device 102.

For illustrative purposes, the compute system 100 is shown with the first device 102 as a client device, although it is understood that the compute system 100 can include the first device 102 as a different type of device. For example, the first device 102 can be a server including a display interface.

Also for illustrative purposes, the compute system 100 is shown with the second device 106 as a server, although it is understood that the compute system 100 can include the second device 106 as a different type of device. For example, the second device 106 can be a client device.

Further, for illustrative purposes, the compute system 100 is shown with interaction between the first device 102 and the second device 106, although it is understood that the first device 102 can similarly interact another instance of the first device 102. Similarly, the second device 106 can similarly interact with another instance of the second device 106.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 312, a first storage circuit 314, a first communication circuit 316, and a first user interface 318, and a first location circuit 320. The first control circuit 312 can include a first control interface 322. The first control circuit 312 can execute a first software 326 to provide the intelligence of the compute system 100.

The first control circuit 312 can be implemented in a number of different manners. For example, the first control circuit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control circuit 312 and other functional units or circuits in the first device 102. The first control interface 322 can also be used for communication that is external to the first device 102.

The first control interface 322 can receive information from the other functional units/circuits or from external sources, or can transmit information to the other functional units/circuits or to external destinations. The external sources and the external destinations refer to sources and destinations external to the first device 102.

The first control interface 322 can be implemented in different ways and can include different implementations depending on which functional units/circuits or external units/circuits are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage circuit 314 can store the first software 326. The first storage circuit 314 can also store the relevant information, such as data representing incoming images, data representing previously presented image, sound files, or a combination thereof.

The first storage circuit 314 can be a volatile memory, a nonvolatile memory, an internal memory, an external memory, or a combination thereof. For example, the first storage circuit 314 can be a nonvolatile storage such as non-volatile random access memory (NVRAM), Flash memory, disk storage, or a volatile storage such as static random access memory (SRAM).

The first storage circuit 314 can include a first storage interface 324. The first storage interface 324 can be used for communication between the first storage circuit 314 and other functional units or circuits in the first device 102. The first storage interface 324 can also be used for communication that is external to the first device 102.

The first storage interface 324 can receive information from the other functional units/circuits or from external sources, or can transmit information to the other functional units/circuits or to external destinations. The external sources and the external destinations refer to sources and destinations external to the first device 102.

The first storage interface 324 can include different implementations depending on which functional units/circuits or external units/circuits are being interfaced with the first storage circuit 314. The first storage interface 324 can be implemented with technologies and techniques similar to the implementation of the first control interface 322.

The first communication circuit 316 can enable external communication to and from the first device 102. For example, the first communication circuit 316 can permit the first device 102 to communicate with the second device 106 of FIG. 1, an attachment, such as a peripheral device or a desktop computer, and the communication path 104.

The first communication circuit 316 can also function as a communication hub allowing the first device 102 to function as part of the communication path 104 and not limited to be an end point or terminal circuit to the communication path 104. The first communication circuit 316 can include active and passive components, such as microelectronics or an antenna, for interaction with the communication path 104.

The first communication circuit 316 can include a first communication interface 328. The first communication interface 328 can be used for communication between the first communication circuit 316 and other functional units or circuits in the first device 102. The first communication interface 328 can receive information from the other functional units/circuits or can transmit information to the other functional units or circuits.

The first communication interface 328 can include different implementations depending on which functional units or circuits are being interfaced with the first communication circuit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device. The first display interface 330 can include a display, a projector, a video screen, a speaker, or any combination thereof.

The first control circuit 312 can operate the first user interface 318 to display information generated by the compute system 100. The first control circuit 312 can also execute the first software 326 for the other functions of the compute system 100, including receiving location information from the first location circuit 320. The first control circuit 312 can further execute the first software 326 for interaction with the communication path 104 via the first communication circuit 316.

The first location circuit 320 can generate location information, current heading, current acceleration, and current speed of the first device 102, as examples. The first location circuit 320 can be implemented in many ways. For example, the first location circuit 320 can function as at least a part of the global positioning system, an inertial vehicle system, a cellular-tower location system, a pressure location system, or any combination thereof. Also, for example, the first location circuit 320 can utilize components such as an accelerometer or global positioning system (GPS) receiver.

The first location circuit 320 can include a first location interface 332. The first location interface 332 can be used for communication between the first location circuit 320 and other functional units or circuits in the first device 102. The first location interface 332 can also be used for communication external to the first device 102.

The first location interface 332 can receive information from the other functional units/circuits or from external sources, or can transmit information to the other functional units/circuits or to external destinations. The external sources and the external destinations refer to sources and destinations external to the first device 102.

The first location interface 332 can include different implementations depending on which functional units/circuits or external units/circuits are being interfaced with the first location circuit 320. The first location interface 332 can be implemented with technologies and techniques similar to the implementation of the first control circuit 312.

The second device 106 can be optimized for implementing an embodiment of the present invention in a multiple device embodiment with the first device 102. The second device 106 can provide the additional or higher performance processing power compared to the first device 102. The second device 106 can include a second control circuit 334, a second communication circuit 336, a second user interface 338, and a second storage circuit 346.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340 of FIG. 3. The second display interface 340 can include a display, a projector, a video screen, a speaker, or any combination thereof.

The second control circuit 334 can execute a second software 342 of FIG. 3 to provide the intelligence of the second device 106 of the compute system 100. The second software 342 can operate in conjunction with the first software 326. The second control circuit 334 can provide additional performance compared to the first control circuit 312.

The second control circuit 334 can operate the second user interface 338 to display information. The second control circuit 334 can also execute the second software 342 for the other functions of the compute system 100, including operating the second communication circuit 336 to communicate with the first device 102 over the communication path 104.

The second control circuit 334 can be implemented in a number of different manners. For example, the second control circuit 334 can be a processor, an embedded processor, a microprocessor, hardware control logic, a hardware finite state machine (FSM), a digital signal processor (DSP), or a combination thereof.

The second control circuit 334 can include a second control interface 344 of FIG. 3. The second control interface 344 can be used for communication between the second control circuit 334 and other functional units or circuits in the second device 106. The second control interface 344 can also be used for communication that is external to the second device 106.

The second control interface 344 can receive information from the other functional units/circuits or from external sources, or can transmit information to the other functional units/circuits or to external destinations. The external sources and the external destinations refer to sources and destinations external to the second device 106.

The second control interface 344 can be implemented in different ways and can include different implementations depending on which functional units/circuits or external units/circuits are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage circuit 346 can store the second software 342. The second storage circuit 346 can also store the information such as data representing incoming images, data representing previously presented image, sound files, or a combination thereof. The second storage circuit 346 can be sized to provide the additional storage capacity to supplement the first storage circuit 314.

For illustrative purposes, the second storage circuit 346 is shown as a single element, although it is understood that the second storage circuit 346 can be a distribution of storage elements. Also for illustrative purposes, the compute system 100 is shown with the second storage circuit 346 as a single hierarchy storage system, although it is understood that the compute system 100 can include the second storage circuit 346 in a different configuration. For example, the second storage circuit 346 can be formed with different storage technologies forming a memory hierarchal system including different levels of caching, main memory, rotating media, or off-line storage.

The second storage circuit 346 can be a volatile memory, a nonvolatile memory, an internal memory, an external memory, or a combination thereof. For example, the second storage circuit 346 can be a nonvolatile storage such as non-volatile random access memory (NVRAM), Flash memory, disk storage, or a volatile storage such as static random access memory (SRAM).

The second storage circuit 346 can include a second storage interface 348. The second storage interface 348 can be used for communication between the second storage circuit 346 and other functional units or circuits in the second device 106. The second storage interface 348 can also be used for communication that is external to the second device 106.

The second storage interface 348 can receive information from the other functional units/circuits or from external sources, or can transmit information to the other functional units/circuits or to external destinations. The external sources and the external destinations refer to sources and destinations external to the second device 106.

The second storage interface 348 can include different implementations depending on which functional units/circuits or external units/circuits are being interfaced with the second storage circuit 346. The second storage interface 348 can be implemented with technologies and techniques similar to the implementation of the second control interface 344.

The second communication circuit 336 can enable external communication to and from the second device 106. For example, the second communication circuit 336 can permit the second device 106 to communicate with the first device 102 over the communication path 104.

The second communication circuit 336 can also function as a communication hub allowing the second device 106 to function as part of the communication path 104 and not limited to be an end point or terminal unit or circuit to the communication path 104. The second communication circuit 336 can include active and passive components, such as microelectronics or an antenna, for interaction with the communication path 104.

The second communication circuit 336 can include a second communication interface 350. The second communication interface 350 can be used for communication between the second communication circuit 336 and other functional units or circuits in the second device 106. The second communication interface 350 can receive information from the other functional units/circuits or can transmit information to the other functional units or circuits.

The second communication interface 350 can include different implementations depending on which functional units or circuits are being interfaced with the second communication circuit 336. The second communication interface 350 can be implemented with technologies and techniques similar to the implementation of the second control interface 344.

The first communication circuit 316 can couple with the communication path 104 to send information to the second device 106 in the first device transmission 308. The second device 106 can receive information in the second communication circuit 336 from the first device transmission 308 of the communication path 104.

The second communication circuit 336 can couple with the communication path 104 to send information to the first device 102 in the second device transmission 310. The first device 102 can receive information in the first communication circuit 316 from the second device transmission 310 of the communication path 104. The compute system 100 can be executed by the first control circuit 312, the second control circuit 334, or a combination thereof.

For illustrative purposes, the second device 106 is shown with the partition containing the second user interface 338, the second storage circuit 346, the second control circuit 334, and the second communication circuit 336, although it is understood that the second device 106 can include a different partition. For example, the second software 342 can be partitioned differently such that some or all of its function can be in the second control circuit 334 and the second communication circuit 336. Also, the second device 106 can include other functional units or circuits not shown in FIG. 3 for clarity.

The functional units or circuits in the first device 102 can work individually and independently of the other functional units or circuits. The first device 102 can work individually and independently from the second device 106 and the communication path 104.

The functional units or circuits in the second device 106 can work individually and independently of the other functional units or circuits. The second device 106 can work individually and independently from the first device 102 and the communication path 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the compute system 100 is described by operation of the first device 102 and the second device 106. It is understood that the first device 102 and the second device 106 can operate any of the modules and functions of the compute system 100.

Figure 4:
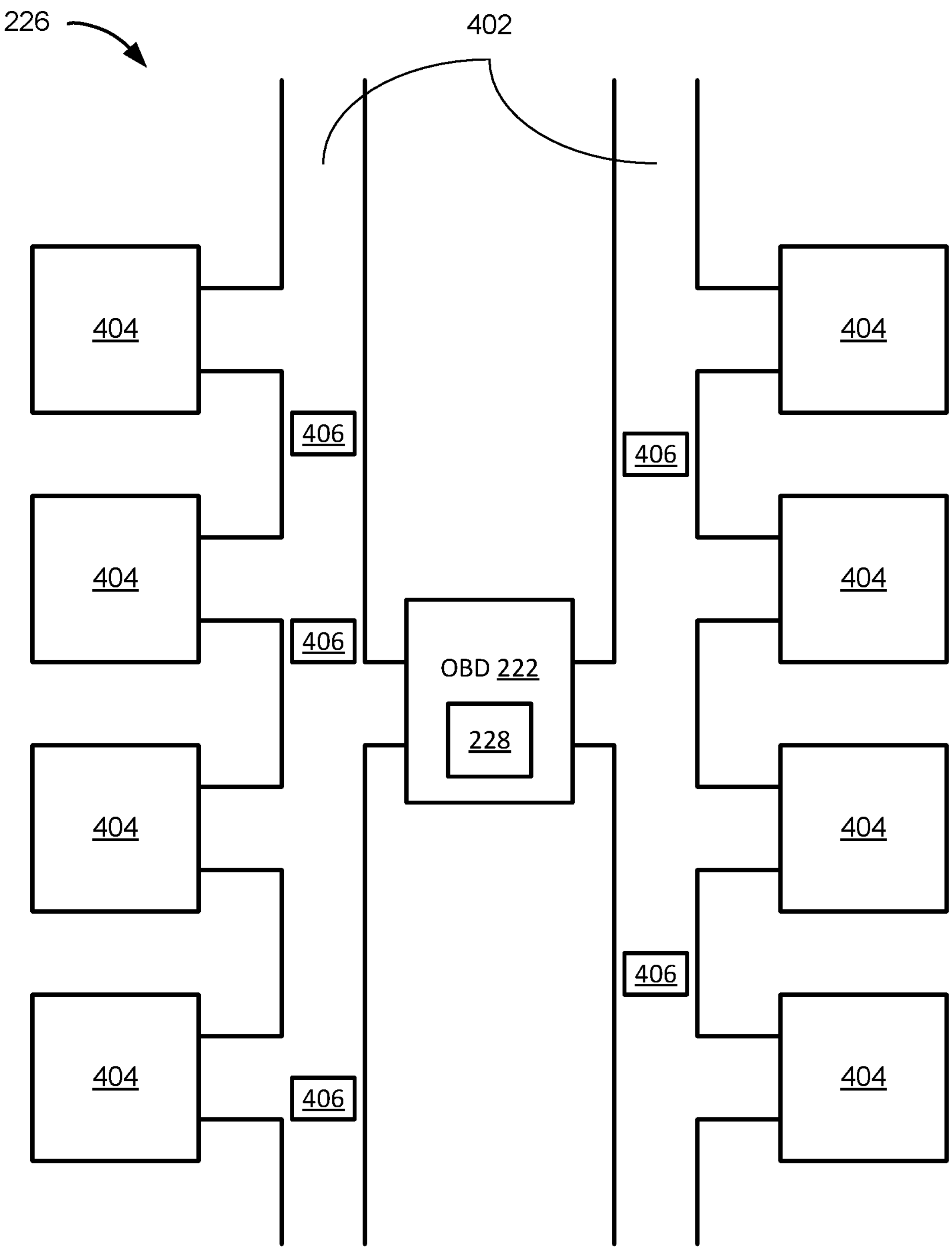
FIG. 4 is an example of a block diagram of a portion of the controller area network within the compute system.

Referring now to FIG. 4, therein is shown an example of a block diagram of a portion of the controller area network 226 of the vehicle 202 in FIG. 2 in the compute system 100 of FIG. 1. The controller area network 226 can include a vehicle bus 402 or multiple instances of the vehicle bus 402. The vehicle bus 402 is the internal communications network that can connect to the vehicle communication circuit 204 of FIG. 2, the vehicle control circuit 206 of FIG. 2, the vehicle storage circuit 208 of FIG. 2, the on-board diagnostics port 228, other interfaces, or a combination thereof. The vehicle bus 402 can operate at a specific baud rate within the controller area network 226. In this embodiment, the multiple instances of the vehicle bus 402 can provide information for the on-board diagnostics 222.

The controller area network 226 can include a node 404 and can connect a number of instances of the node 404. Examples of the node 404 can include the vehicle communication circuit 204, the vehicle control circuit 206, the vehicle storage circuit 208, other hardware circuits, or a combination thereof. As a further example, the node 402 can include an on-board diagnostics dongle connected to the on-board diagnostics port 228, which can be connected to the controller area network 226.

The node 404 can be electrical systems or subsystems in the vehicle 202 that operate some function for the vehicle 202. The vehicle 202 can include numerous instances of the node 404 connected to the vehicle bus 402 of the controller area network 226. For example, the node 404 can operate the function for or relating to the transmission, airbags, antilock braking system, cruise control, power steering, audio systems, doors, battery, or a combination thereof.

The node 404 can interact with the vehicle communication circuit 204, the vehicle control circuit 206, the vehicle storage circuit 208, the on-board diagnostics port 228, further instances of the node 404, other devices, or a combination thereof along the controller area network 226. For example, the node 404 can send and receive a message 406 along the controller area network 226.

The node 404 can also communicate with an external entity or database. For example, the node 404 can receive data, control commands, or a combination thereof from an external entity or database. As a further example, the node 404 can transmit data, control commands, or a combination thereof to an external entity or database.

For brevity and clarity, the description for the controller area network 226 will be described with the node 404 representing any devices connected to an instance of the vehicle bus 402 of the controller area network 226, as examples described earlier. The instances of the node 404 can be similar, same, or different connected to the controller area network 226.

The message 406 is a packet of data, control commands, or a combination thereof that is transmitted along the vehicle bus 402 of the controller area network 226. For example, the message 406 can provide information about the systems or subsystems in the vehicle 202. As examples, the message 406 can include control commands, status information, error information, queries, or a combination thereof.

The message 406 can assist with the operation and function of the controller area network 226. As an example, the message 406 can provide a coordination mechanism from one instance of the node 404 to operate with or control the operation of the controller area network 226, another instance of the node 404, or a combination thereof.

Figure 5:
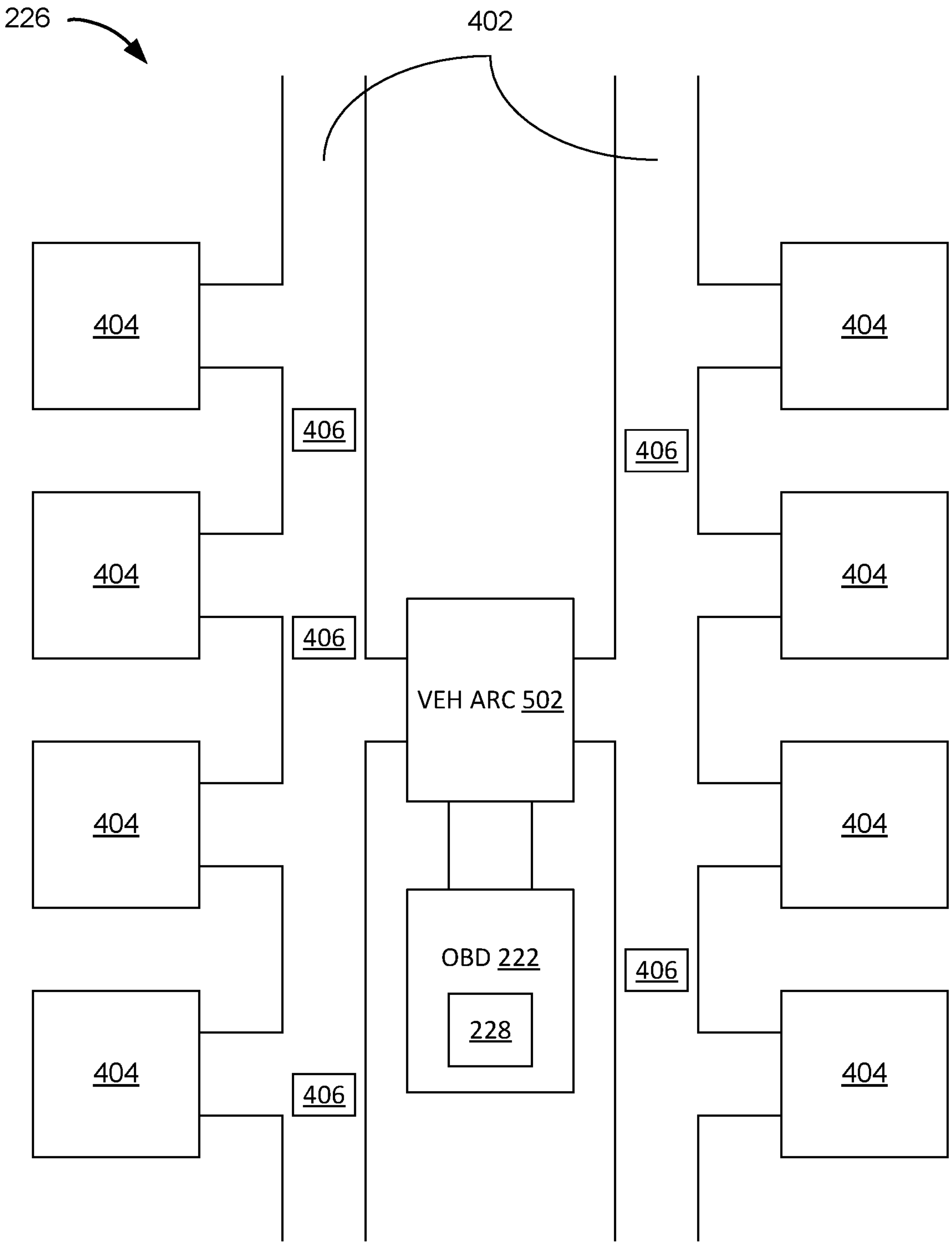
FIG. 5 is an example of a block diagram of a portion of the controller area network with a vehicle architecture within the compute system.

Referring now to FIG. 5, therein is shown an example of another embodiment of a block diagram of a portion of the controller area network 226 of the vehicle 202 in FIG. 2 in the compute system 100 of FIG. 1. In this embodiment, the on-board diagnostics 222 is connected to the controller area network 226 through a vehicle architecture 502. The vehicle architecture 502 is an interface between multiple instances of the vehicle bus 402 operating at different baud rates. The vehicle architecture 502 can include additional functionality. For example, the vehicle architecture 502 can function to include data rate adaption, message filtering, and identifier conversion between multiple instances of the vehicle bus 402.

The vehicle architecture 502 can prevent the on-board diagnostics 222 from receiving the message 406 that is transmitted along the controller area network 226. The vehicle architecture 502 converts the message 406 along the controller area network 226 when communicating with the on-board diagnostics 222, the node 404 connected to the on-board diagnostics port 228, or a combination thereof. For example, the on-board diagnostics 222, the node 404 connected to the on-board diagnostics port 228, or a combination thereof is unable to receive the message 406 through the vehicle architecture 502.

Figure 6:
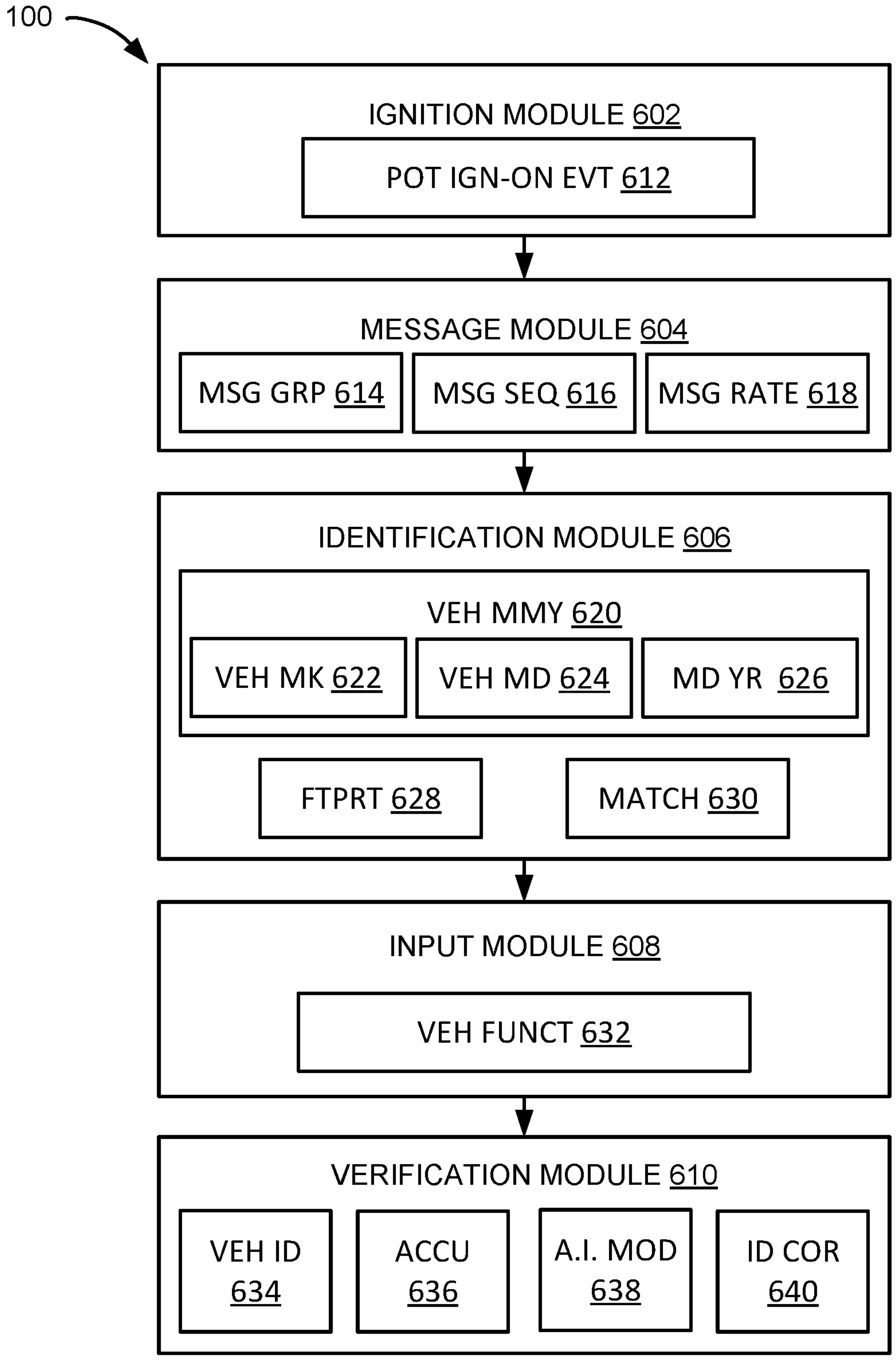
FIG. 6 is an example of a control flow of the compute system.

Referring now to FIG. 6, therein is shown a control flow for the compute system 100. The control flow in FIG. 6 depicts and describes an example of how to identify a vehicle make-model year 620 of the vehicle 202 of FIG. 2 utilizing the on-board diagnostics 222 of FIG. 2 of the controller area network 226 of FIG. 2. The compute system 100 can include an ignition module 602, a message module 604, an identification module 606, an input module 608, a verification module 610, or a combination thereof. The aforementioned modules can be included in the first software 326 of FIG. 3, the second software 342 of FIG. 3, or a combination thereof. The first software 326, the second software 342, or a combination thereof can be executed with the first control circuit 312 of FIG. 3, the second control circuit 334 of FIG. 3, the vehicle control circuit 206 of FIG. 2, or a combination thereof.

In the example shown in FIG. 6, the ignition module 602 can be coupled to the message module 604. The message module 604 can be coupled to the identification module 606. The identification module 606 can be coupled to the input module 608. The input module 608 can be coupled to the verification module 610. The modules can be coupled using wired or wireless connections, by including an output of one module as an input of the other module, by including operations of one module influence operation of the other module, or a combination thereof. The module can be directly coupled with no intervening structures or objects other than the connector there-between, or indirectly coupled.

The ignition module 602 is configured to detect a potential ignition-on event 612 for the vehicle 202. The potential ignition-on event 612 is when the ignition status 224 of FIG. 2 of the vehicle 202 is in the on position. For example, the ignition module 602 is configured to receive the ignition status 224. As described earlier, the ignition status 224 can be provided from the on-board diagnostics 222, the node 404 of FIG. 4, or a combination thereof.

The ignition module 602 can receive the ignition status 224, the on-board diagnostics 222, or a combination thereof with one or more communication circuits, such as the first communication circuit 316 of FIG. 3, the second communication circuit 336 of FIG. 3, the vehicle communication circuit 204 of FIG. 2, or a combination thereof. The flow can progress to the message module 604 to receive the message 406 of FIG. 4 transmitted along the controller area network 226.

The message module 604 is configured to receive the message 406 from the controller area network 226. The message module 604 can obtain the date and time the message 406 is transmitted, the length of time the message 406 is transmitted, the vehicle bus 402 of the controller area network 226 that the message 406 is transmitted along, the identification of the message 406, the length of the message 406, and the data of the message 406.

The message module 604 can determine a message group 614 from the instances of the message 406. The message group 614 is the instances of the message 406 that is received by the on-board diagnostics 222, the node 404, or a combination thereof upon detecting the potential ignition-on event 612. For example, the message group 614 can be the first ten instances of the message 406 that are transmitted by the vehicle communication circuit 204 along the controller area network 226 after the potential ignition-on event 612. As a specific example, the message group 614 can be the first 12 instances of the message 406 that are transmitted by the vehicle communication circuit 204 along the controller area network 226 after the potential ignition-on event 612.

| Date and Time | Time | Channel | ID | Length | Data |
|---|---|---|---|---|---|
| 1:15:02.551796 PM | 0.000000 | CAN 2 | 164 | 8 | 00 00 40 08 C4 00 00 10 |
| 1:15:02.552070 PM | 0.000274 | CAN 2 | 294 | 8 | 05 0C 40 02 4C 43 00 0B |
| 1:15:02.552322 PM | 0.000252 | CAN 2 | 1A4 | 8 | 00 00 00 00 00 00 00 18 |
| 1:15:02.552565 PM | 0.000242 | CAN 2 | 1B0 | 7 | 00 00 00 00 00 00 57 |
| 1:15:02.552825 PM | 0.000260 | CAN 2 | 1D0 | 8 | 00 00 00 00 00 00 00 0A |
| 1:15:02.553081 PM | 0.000256 | CAN 2 | 158 | 8 | 00 00 02 86 00 00 00 37 |
| 1:15:02.553289 PM | 0.000208 | CAN 2 | 188 | 6 | 00 00 00 01 00 24 |
| 1:15:02.553683 PM | 0.000394 | CAN 2 | 136 | 8 | 10 02 00 00 00 00 00 0B |

-continued

| Date and Time | Time | Channel | ID | Length | Data |
|---|---|---|---|---|---|
| 1:15:02.553924 PM | 0.000240 | CAN 2 | 13A | 8 | 2C 00 B1 00 00 00 00 88 |
| 1:15:02.554172 PM | 0.000248 | CAN 2 | 13F | 8 | 00 00 00 00 00 00 00 05 |
| 1:15:02.554418 PM | 0.000246 | CAN 2 | 17C | 8 | 00 00 02 B1 00 00 00 42 |
| 1:15:02.554582 PM | 0.000164 | CAN 2 | 1DC | 4 | 02 02 B1 0E |
| 1:15:02.562026 PM | 0.007444 | CAN 2 | 164 | 8 | 00 00 40 08 C5 00 00 2E |
| 1:15:02.563074 PM | 0.001048 | CAN 2 | 158 | 8 | 00 00 02 86 00 00 00 0A |
| 1:15:02.563282 PM | 0.000208 | CAN 2 | 188 | 6 | 00 00 00 01 00 33 |
| 1:15:02.563670 PM | 0.000388 | CAN 2 | 136 | 8 | 10 02 00 00 00 00 00 1A |
| 1:15:02.563913 PM | 0.000242 | CAN 2 | 13A | 8 | 2C 00 B1 00 00 00 00 97 |
| 1:15:02.564047 PM | 0.000134 | CAN 2 | 39 | 2 | 00 1B |
| 1:15:02.564295 PM | 0.000248 | CAN 2 | 13F | 8 | 00 00 00 00 00 00 00 14 |
| 1:15:02.564543 PM | 0.000248 | CAN 2 | 17C | 8 | 00 00 02 B1 00 00 00 51 |
| 1:15:02.571965 PM | 0.007422 | CAN 2 | 164 | 8 | 00 00 40 08 C4 00 00 3E |
| 1:15:02.572249 PM | 0.000284 | CAN 2 | 309 | 8 | 00 00 00 00 00 00 00 84 |
| 1:15:02.572497 PM | 0.000238 | CAN 2 | 1A4 | 8 | 00 00 00 00 00 00 00 27 |
| 1:15:02.572736 PM | 0.000238 | CAN 2 | 1B0 | 7 | 00 00 00 00 00 00 66 |
| 1:15:02.572996 PM | 0.000260 | CAN 2 | 1D0 | 8 | 00 00 00 00 00 00 00 0A |
| 1:15:02.573242 PM | 0.000246 | CAN 2 | 158 | 8 | 00 00 02 85 00 00 00 1A |
| 1:15:02.573450 PM | 0.000208 | CAN 2 | 188 | 6 | 00 00 00 01 00 06 |
| 1:15:02.573694 PM | 0.000244 | CAN 2 | 136 | 8 | 10 02 00 00 00 00 00 29 |
| 1:15:02.573935 PM | 0.000240 | CAN 2 | 13A | 8 | 2C 00 B1 00 00 00 00 A6 |
| 1:15:02.574183 PM | 0.000248 | CAN 2 | 13F | 8 | 00 00 00 00 00 00 00 23 |
| 1:15:02.574431 PM | 0.000248 | CAN 2 | 17C | 8 | 00 00 02 B1 00 00 00 60 |
| 1:15:02.574599 PM | 0.000168 | CAN 2 | 1DC | 4 | 02 02 B1 1D |
| 1:15:02.577009 PM | 0.002410 | CAN 2 | 39 | 2 | 00 2A |

The message module 604 can determine a message sequence 616 of the message group 614. The message sequence 616 is the order of the instances of the message 406 in the message group 614. The message sequence 616 can also be determined based on the timing between each instance of the message 406 in the message group 614. For example, the message sequence 616 can be determined based on the order and timing of the initial 10 instances of the message 406 in the message group 614. As a further example, the message sequence 616 can be determined based on the order and timing of the initial 12 instances of the message 406 in the message group 614.

The message module 604 can detect a message rate 618 based on the message sequence 616 of the message group 614. The message rate 618 is the frequency that the message sequence 616 of the message group 614 is transmitted along the controller area network 226 after the potential ignition-on event 612. For example, the message module 604 can determine the message rate 618 by calculating how often the message group 614 is transmitted along the controller area network 226 by detecting the same instances of the message sequence 616 in a period of 1 minute after the potential ignition-on event 612. As a further example, the message module 604 can determine the message rate 618 by calculating how often the message group 614 is transmitted along the controller area network 226 by detecting the same instances of the message sequence 616 in a period of 1 second. The message module 604 can detect the message rate 618 utilizing the on-board diagnostics 222, the node 404, or a combination thereof.

The message module 604 can also determine that the controller area network 226 utilizes the vehicle architecture 502 of FIG. 5 utilizing the on-board diagnostics 222. The message module 604 can determine that the controller area network 226 of the vehicle 202 utilizes the vehicle architecture 502 when the on-board diagnostics 222, the node 404 connected to the on-board diagnostics port 228, or a combination thereof is unable to obtain the message 406, the message group 614, or a combination thereof. For example, the message module 604 can determine that the controller area network 226 utilizes the vehicle architecture 502 when the on-board diagnostics 222, the node 404 connected to the on-board diagnostics port 228, or a combination thereof is unable to obtain the message 406 after the potential ignition-on event 612.

The message module 604 can receive the message 406, the message group 614, or a combination thereof with one or more communication circuits, such as the first communication circuit 316, the second communication circuit 336, the vehicle communication circuit 204, or a combination thereof. The message module 604 can determine the message sequence 616, the message rate 618, the vehicle architecture 502 of the controller area network 226, or a combination thereof with one or more control circuits, such as the first control circuit 312, the second control circuit 334, the vehicle control circuit 206, or a combination thereof.

The flow can progress to the identification module 606 when the message group 614, the message sequence 616, the message rate 618, the vehicle architecture 502, or a combination thereof is determined from the on-board diagnostics 222, the node 404, or a combination thereof. The message module 604 can pass the processing results as an output to the identification module 606.

The identification module 606 is configured to determine the vehicle make-model-year 620 of the vehicle 202. The vehicle make-model-year 620 can allow the identification module 606 to obtain various information regarding the vehicle 202. For example, the vehicle make-model-year 620 can allow the identification module 606 to obtain the specifications for the vehicle 202 as intended by the original equipment manufacturer. As a further example, the vehicle make-model-year 620 can allow the identification module 606 to obtain the parameters for the vehicle 202, such as odometer, fuel, tire pressure, or a combination thereof. The identification module 606 can obtain information for the vehicle 202 based on the vehicle make-model-year 620 by communicating with an external database or entity.

The vehicle make-model-year 620 can include a vehicle make 622, a vehicle model 624, a model year 626, or a combination thereof for the vehicle 202. The vehicle make 622 is utilized to determine the manufacturer of the vehicle 202. The vehicle make 622 can be utilized to obtain information for the vehicle 202 from the manufacturer. The vehicle make 622 can also be utilized to determine the vehicle model 624 from the manufacturer.

The vehicle model 624 is utilized to determine the specific product or category of products designed by the manufacturer. The vehicle model 624 can identify the product or category of products based on the vehicle make 622 of the vehicle 202. The vehicle model 624 can be utilized to determine the model year 626 for the vehicle 202. The model year 626 is the specific design of the vehicle model 624 by the manufacturer of the vehicle 202. The model year 626 can be utilized to obtain the specifications and parameters for the vehicle 202 as intended by the manufacturer of the vehicle 202.

The identification module 606 can determine the vehicle make-model-year 620, the vehicle make 622, the vehicle model 624, the model year 626, or a combination thereof based on the message group 614, the message sequence 616, the message rate 618, or a combination thereof. The identification module 606 can obtain the message group 614, the message sequence 616, the message rate 618, or a combination thereof from the on-board diagnostics 222 of the vehicle 202. The identification module 606 can determine a footprint 628 of the vehicle 202 based on the message group 614, the message sequence 616, the message rate 618, or a combination thereof to determine the vehicle make-model-year 620, the vehicle make 622, the vehicle model 624, the model year 626, or a combination thereof.

The footprint 628 is the specific instances of the message group 614, the message sequence 616, the message rate 618, or a combination thereof of the vehicle 202. The footprint 628 can be utilized to identify the vehicle make-model-year 620, the vehicle make 622, the vehicle model 624, the model year 626, or a combination thereof of the vehicle 202. The identification module 606 can compare the footprint 628 of the vehicle 202 to a database that identifies the vehicle make-model-year 620, the vehicle make 622, the vehicle model 624, the model year 626, or a combination thereof to determine a match 630. The identification module 606 can determine the match 630 by communicating with an external database or entity.

The match 630 is the identification of the footprint 628, the message group 614, the message sequence 616, the message rate 618, or a combination thereof of the vehicle 202 with a database. The database can include instances of the footprint 628, the message group 614, the message sequence 616, the message rate 618, or a combination thereof that have been assigned to instances of the vehicle make-model-year 620, the vehicle make 622, the vehicle model 624, the model year 626, or a combination thereof. The identification module 606 can compare the footprint 628 of the vehicle 202 with the database to determine whether the footprint 628, the message group 614, the message sequence 616, the message rate 618 or a combination thereof has been identified as a specific instance of the vehicle make-model-year 620, the vehicle make 622, the vehicle model 624, the model year 626, or a combination thereof. The identification module 606 can determine the match 630 when the same instance of the footprint 628, the message group 614, the message sequence 616, the message rate 618, or a combination thereof of the vehicle 202 is found in the database.

The identification module 606 can also utilize the vehicle architecture 502 to assist with the determination of the vehicle make-model-year 620, the vehicle make 622, the vehicle model 624, the model year 626, or a combination thereof. The identification module 606 can determine that the vehicle 202 utilizes the vehicle architecture 502 in the footprint 628. The identification module 606 can utilize the vehicle architecture 502 in the footprint 628 to assist with the determination of the vehicle make-model-year 620, the vehicle make 622, the vehicle model 624, the model year 626, or a combination thereof.

The identification module 606 can receive the message group 614, the message sequence 616, the message rate 618, the footprint 628, or a combination thereof with one or more communication circuits, such as the first communication circuit 316, the second communication circuit 336, the vehicle communication circuit 204, or a combination thereof. The identification module 606 can determine the vehicle make-model-year 620, the vehicle make 622, the vehicle model 624, the model year 626, or a combination thereof based on the match 630 in the footprint 628 with one or more control circuits, such as the first control circuit 312, the second control circuit 334, the vehicle control circuit 206, or a combination thereof.

The flow can progress to the input module 608 after comparing the message group 614, the message sequence 616, the message rate 618, the vehicle architecture 502, or a combination thereof with the footprint 628. The identification module 606 can pass the processing results as an output to the input module 608.

The input module 608 is configured to receive and implement a vehicle function 632 based on the vehicle make-model-year 620 of the vehicle 202. The vehicle function 632 is the instruction or command that is utilized by the on-board diagnostics 222 of the vehicle 202. The input module 608 can obtain the vehicle function 632 from the first device 102 of FIG. 1, the second device 106 of FIG. 1, or a combination thereof. The input module 608 can also obtain the vehicle function 632 from an external database or entity.

The vehicle function 632 can utilize the parameters set by the original equipment manufacturer to obtain diagnostics information for the vehicle 202. For example, the input module 608 can transmit the vehicle function 632 to allow the on-board diagnostics 222 to accurately determine the ignition status 224 of the vehicle 202 with an automatic stop-start function. As a further example, the input module 608 can transmit the vehicle function 632 to allow the on-board diagnostics 222 to calculate the fuel usage of the vehicle 202 with a hybrid engine.

The vehicle function 632 can also provide commands to control the vehicle 202 or a portion of the vehicle 202. For example, the input module 608 can transmit the vehicle function 632 to control the ignition of the vehicle 202. As a further example, the input module 608 can transmit the vehicle function 632 to control the on-board diagnostics 222 of the vehicle 202.

The input module 608 can receive the vehicle function 632 with one or more communication circuits, such as the first communication circuit 316, the second communication circuit 336, the vehicle communication circuit 204, or a combination thereof. The input module 608 can implement the vehicle function 632 with one or more control circuits, such as the first control circuit 312, the second control circuit 334, the vehicle control circuit 206, or a combination thereof.

The flow can progress to the verification module 610 to confirm the vehicle make-model-year 620 of the vehicle 202.

The verification module 610 is configured to decode a vehicle identification 634 from the vehicle 202 and improve an accuracy 636 of the footprint 628. The vehicle identification 634 is the information regarding the vehicle make-model-year 620, the vehicle make 622, the vehicle model 624, the model year 626, or a combination thereof assigned to the vehicle 202 by the manufacturer. For example, the vehicle identification 634 can be determined from the vehicle identification number (VIN) assigned to the vehicle 202.

The vehicle identification 634 can be obtained from the on-board diagnostics 222, the node 404 connected to the on-board diagnostics port 228, or a combination thereof. For example, the verification module 610 can fetch the vehicle identification 634 utilizing the on-board diagnostics 222. As a further example, the verification module 610 can decode the vehicle identification 634 from the controller area network 226 utilizing the on-board diagnostics 222, the node 404 connected to the on-board diagnostics port 228, or a combination thereof. The vehicle identification 634 can be utilized by an artificial intelligence model 638 to confirm the vehicle make-model-year 620, the vehicle make 622, the vehicle model 624, the model year 626, or a combination thereof with the footprint 628.

The artificial intelligence model 638 can be an artificial intelligence or machine learning implementation that can be trained to learn, determine, or detect the vehicle make-mode-year 620, the vehicle make 622, the vehicle model 624, the model year 626, or a combination thereof based on the footprint 628, the vehicle identification 634, or a combination thereof. For example, the artificial intelligence model 638 can be trained to learn to detect the vehicle make-mode-year 620, the vehicle make 622, the vehicle model 624, the model year 626, or a combination thereof based on the message group 614, the message sequence 616, the message rate 618, the vehicle identification 634, or a combination thereof. The artificial intelligence model 638 can be trained utilizing information, from a database or other input from users of the compute system 100, the vehicle 202, the first device 102, the second device 106, or a combination thereof.

The artificial intelligence model 638 can be implemented in a number of ways. For example, the artificial intelligence model 638 can be implemented with neural networks, such as convolution neural network, full connected network, or a combination thereof. Also for example, the artificial intelligence model 638 can include unsupervised learning and other forms of supervised learning. The artificial intelligence model 638 can work with artificial intelligence or machine learning that provides global minimum, one or more local minima, or a combination thereof.

The artificial intelligence model 638 can generate an identification correction 640 when the vehicle make-model-year 620 based on the vehicle identification 634 conflicts with the footprint 628. The identification correction 640 is the vehicle make-model-year 620, the vehicle make 622, the vehicle model 624, the model year 626, or a combination thereof to be associated with the footprint 628, the message group 614, the message sequence 616, the message rate 618, or a combination thereof. The identification correction 640 updates the vehicle make-model-year 620, the vehicle make 622, the vehicle model 624, the model year 626, or a combination thereof associated with the footprint 628 in the database to improve the accuracy 636 of the database.

The accuracy 636 is the verification of the vehicle make-model-year 620, the vehicle make 622, the vehicle model 624, the model year 626, or a combination thereof of the vehicle 202 based on the footprint 628, the vehicle identification 634, the identification correction 640, or a combination thereof. The accuracy 636 allows for the correct determination of the vehicle make-model-year 620, the vehicle make 622, the vehicle model 624, the model year 626, or a combination thereof of the vehicle 202 by updating the database with the identification correction 640 for the footprint 628. The verification module 610 utilizes the footprint 628, the vehicle identification 634, the identification correction 640, or a combination thereof to identify the vehicle make-model-year 620, the vehicle make 622, the vehicle model 624, the model year 626, or a combination thereof in the database. The accuracy 636 allows for the match 630 to correctly determine the vehicle make-model-year 620, the vehicle make 622, the vehicle model 624, the model year 626, or a combination thereof based on the footprint 628.

The verification module 610 can also display the vehicle identification 634, the vehicle make-model-year 620, or a combination thereof on the first device 102, the second device 106, or a combination thereof. The verification module 610 can allow input from the user to confirm the vehicle identification 634, the vehicle make-model-year 620, or a combination thereof utilizing the first user interface 318 of FIG. 3, the second user interface 338 of FIG. 3, or a combination thereof.

The verification module 610 can obtain the vehicle identification 634 with one or more communication circuits, such as the first communication circuit 316, the second communication circuit 336, the vehicle communication circuit 204, or a combination thereof. The verification module 610 can operate the artificial intelligence model 638, determine the identification correction 640, improve the accuracy 636 of the footprint 628, or a combination thereof with one or more control circuits, such as the first control circuit 312, the second control circuit 334, the vehicle control circuit 206, or a combination thereof. The verification module 610 can display the vehicle identification 634, the vehicle make-model-year 620, or a combination thereof with one or more display interfaces, such as the first display interface 330 of FIG. 3, the second display interface 340 of FIG. 3, or a combination thereof.

It has been discovered that the embodiments improve the function of the compute system 100, the vehicle 202, or a combination thereof by determining the vehicle make-model-year 620 for the vehicle 202 before decoding the vehicle identification 634 from the controller area network 226. For example, the compute system 100, the first device 102, the second device 106, or a combination thereof can utilize the message group 614, the message sequence 616, the message rate 618, or a combination thereof to determine the vehicle make-model-year 620.

It has been yet further discovered that the compute system 100 improves the accuracy and performance for calculating the diagnostic information for the vehicle 202. For example, the compute system 100 can implement the vehicle function 632 based on the vehicle make-model-year 620 of the vehicle 202. As a further example, the compute system 100 can verify the vehicle make-model-year 620 of the vehicle 202 utilizing the vehicle identification 634, the footprint 628, or a combination thereof.

It has been yet further discovered that the embodiments improve the function of the compute system 100, the vehicle 202, or a combination thereof by improving the accuracy 636 of the footprint 628 utilizing the artificial intelligence model 638. For example, the compute system 100 can determine the vehicle make-model-year 620 of the vehicle 202 faster based on the footprint 628. As a further example, the compute system 100, the vehicle 202, or a combination thereof can determine the vehicle make-mode-year 620 when the vehicle identification 634 cannot be decoded from the controller area network 226 of the vehicle 202.

The modules described in this application can be hardware implementation or hardware accelerators, including passive circuitry, active circuitry, or both, in the first storage circuit 314, the second storage circuit 346, the first control circuit 312, the second control circuit 334, or a combination thereof. The module can also be hardware implementation or hardware accelerators, including passive circuitry, active circuitry, or both, within the first device 102, the second device 106, or a combination thereof but outside of the first storage circuit 314, the second storage circuit 346, the first control circuit 312, the second control circuit 334, or a combination thereof.

The compute system 100 has been described with module functions or order as an example. The compute system 100 can partition the modules differently or order the modules differently. For example, the compute system 100 can be without the error passive module 510, the bus off module 512, or a combination thereof.

For illustrative purposes, the various modules have been described as being specific to the first device 102, the second device 106, or the vehicle 202. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The modules described in this application can be stored in the non-transitory computer readable medium. The first storage circuit 314, the second storage circuit 346, or a combination thereof can represent the non-transitory computer readable medium. The first storage circuit 314, the second storage circuit 346, the vehicle storage circuit 208, or a combination thereof, or a portion therein can be removable from the first device 102, the second device 106, the vehicle 202, or a combination thereof. Examples of the non-transitory computer readable medium can be a non-volatile memory card or stick, an external hard disk drive, a tape cassette, or an optical disk.

The physical transformation of the vehicle function 632 representing the real-world environment results in the real-time movement in the physical world, such as physical change in information or environment processed for the user on one or more of the devices or physical displacement of the vehicle 202. Movement in the physical world results in updates to the vehicle 202 which can be fed back into the compute system 100 and further influence operation or update the vehicle 202.

Figure 7:
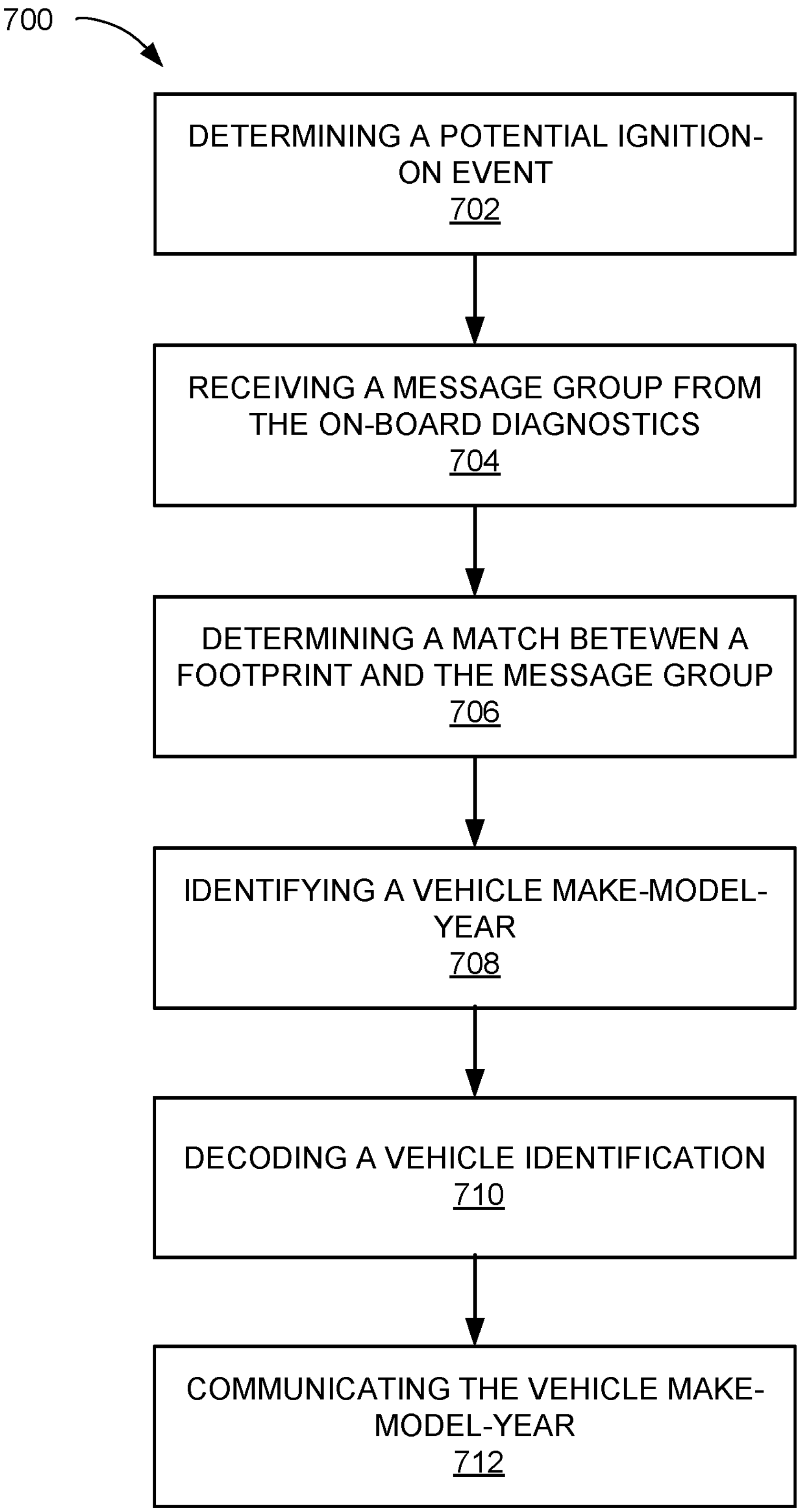
FIG. 7 is a flow chart of a method of operation of a compute system in an embodiment of the present invention.

Referring now to FIG. 7, therein is shown a flow chart of a method 700 of operation of a compute system 100 in an embodiment of the present invention. The method 700 includes: determining a potential ignition-on event from an on-board diagnostic in a box 702; receiving a message group from the on-board diagnostics based on the potential ignition-on event in a box 704; determining a match between a footprint and the message group in a box 706; identifying a vehicle make-model-year based on the match and the footprint in a box 708; decoding a vehicle identification based on the vehicle make-model-year and the footprint in a box 710; and communicating the vehicle make-model-year, the vehicle identification, or a combination thereof for displaying on a device in a box 712.

As an example, the method 700 further includes wherein identifying the vehicle make-model-year includes determining a vehicle make; and determining a vehicle model, a model year, or a combination thereof based on a message sequence of the message group. Further as an example, the method 700 includes receiving an identification correct for the vehicle identification; and supplementing the message group as the footprint with the identification correction to improve an accuracy of the match.

Also as an example, the method 700 includes wherein identifying the vehicle make-model-year include determining a vehicle model, a model year, or a combination thereof based on: a message sequence of the message group; and a message rate within the message group. Also as an example, the method 700 includes triggering a vehicle function based on the vehicle make-model-year identified by the match.

Yet further as an example, the method 700 includes determining a vehicle architecture based on not receiving a message group from the on-board diagnostics; and linking the vehicle architecture as the footprint to the vehicle make-model-year.

Still further as an example, the method 700 includes receiving an identification correction for the vehicle identification; and supplementing the message group as the footprint with the identification correction to improve an accuracy of the match including improving an artificial intelligence model to identify the vehicle make-model-year, the vehicle identification, or a combination thereof based on the identification correction.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation for a compute system comprising:

determining a potential ignition-on event of a vehicle from an on-board diagnostic with the potential ignition-on event that enables a vehicle function to be transmitted to the on-board diagnostic or to control the vehicle;

receiving a message group through an on-board diagnostic port of the on-board diagnostic based on the potential ignition-on event including detecting multiple instances of the message group in a controller area network during a one second period to determine a message rate;

determining a match between a footprint and the message group, wherein the footprint includes a specific instance of the message group, a message sequence, the message rate, or a combination thereof of the vehicle;

identifying a vehicle make-model-year based on the match and the footprint;

decoding a vehicle identification based on the vehicle make-model-year and the footprint; and communicating the vehicle make-model-year, the vehicle identification, or a combination thereof.

2. The method as claimed in claim 1 wherein identifying the vehicle make-model-year includes:

determining a vehicle make; and determining a vehicle model, a model year, or a combination thereof based on a message sequence of the message group.

3. The method as claimed in claim 1 further comprising:

receiving an identification correction for the vehicle identification; and supplementing the message group as the footprint with the identification correction to improve an accuracy of the match.

4. The method as claimed in claim 1 wherein identifying the vehicle make-model-year includes determining a vehicle model, a model year, or a combination thereof based on:

a message sequence of the message group; and the message rate within the message group.

5. The method as claimed in claim 1 further comprising trigger a vehicle function based on the vehicle make-model-year identified by the match.

6. The method as claimed in claim 1 further comprising:

determining a vehicle architecture based on not receiving a message group from the on-board diagnostics; and linking the vehicle architecture as the footprint to the vehicle make-model-year.

7. The method as claimed in claim 1 further comprising:

receiving an identification correction for the vehicle identification; and supplementing the message group as the footprint with the identification correction to improve an accuracy of the match including improving an artificial intelligence model to identify the vehicle make-model-year, the vehicle identification, or a combination thereof based on the identification correction.

8. A compute system comprising:

a communication circuit configured to:

determine a potential ignition-on event of a vehicle from an on-board diagnostic with the potential ignition-on event that enables a vehicle function to be transmitted to the on-board diagnostic or to control the vehicle, receive a message group through an on-board diagnostic port of the on-board diagnostic based on the potential ignition-on event including multiple instances of the message group detected in a controller area network during a one second period to determine a message rate;

a control circuit, coupled to the communication circuit, configured to:

determine a match between a footprint and the message group, wherein the footprint includes a specific instance of the message group, a message sequence, the message rate, or a combination thereof of the vehicle, identify a vehicle make-model-year based on the match and the footprint, decode a vehicle identification based on the vehicle make-model-year and the footprint, and communicate the vehicle make-model-year, the vehicle identification, or a combination thereof.

9. The system as claimed in claim 8 wherein the control circuit is further configured to:

determine a vehicle make; and determine a vehicle model, a model year, or a combination thereof based on a message sequence of the message group.

10. The system as claimed in claim 8 wherein the control circuit is further configured to:

receive an identification correction for the vehicle identification; and supplement the message group as the footprint with the identification correction to improve an accuracy of the match.

11. The system as claimed in claim 8 wherein the control circuit is further configured to determine a vehicle model, a model year, or a combination thereof based on:

a message sequence of the message group; and the message rate within the message group.

12. The system as claimed in claim 8 wherein the control circuit is further configured to trigger a vehicle function based on the vehicle make-model-year identified by the match.

13. The system as claimed in claim 8 wherein the control circuit is further configured to:

determine a vehicle architecture based on not receiving a message group from the on-board diagnostics; and link the vehicle architecture as the footprint to the vehicle make-model-year.

14. The system as claimed in claim 8 wherein the control circuit is further configured to:

receive an identification correction for the vehicle identification; and supplement the message group as the footprint with the identification correction to improve an accuracy of the match including improving an artificial intelligence model to identify the vehicle make-model-year, the vehicle identification, or a combination thereof based on the identification correction.

15. A non-transitory computer readable medium including instructions executable by a control circuit for a compute system comprising:

determining a potential ignition-on event of a vehicle from an on-board diagnostic with the potential ignition-on event that enables a vehicle function to be transmitted to the on-board diagnostic or to control the vehicle;

receiving a message group through an on-board diagnostic port of the on-board diagnostic based on the potential ignition-on event including detecting multiple instances of the message group in a controller area network during a one second period to determine a message rate;

determining a match between a footprint and the message group, wherein the footprint includes a specific instance of the message group, a message sequence, the message rate, or a combination thereof of the vehicle;

identifying a vehicle make-model-year based on the match and the footprint;

decoding a vehicle identification based on the vehicle make-model-year and the footprint; and communicating the vehicle make-model-year, the vehicle identification, or a combination thereof.

16. The non-transitory computer readable medium as claimed in claim 15 further comprising:

determining a vehicle make; and determining a vehicle model, a model year, or a combination thereof based on a message sequence of the message group.

17. The non-transitory computer readable medium as claimed in claim 15 further comprising:

receiving an identification correction for the vehicle identification; and supplementing the message group as the footprint with the identification correction to improve an accuracy of the match.

18. The non-transitory computer readable medium as claimed in claim 15 further comprising determining a vehicle model, a model year, or a combination thereof based on:

a message sequence of the message group; and the message rate within the message group.

19. The non-transitory computer readable medium as claimed in claim 15 further comprising trigger a vehicle function based on the vehicle make-model-year identified by the match.

20. The non-transitory computer readable medium as claimed in claim 15 further comprising:

determining a vehicle architecture based on not receiving a message group from the on-board diagnostics; and linking the vehicle architecture as the footprint to the vehicle make-model-year.

* * * * *